(12) United States Patent
Michalski et al.

(10) Patent No.: US 10,819,182 B2
(45) Date of Patent: Oct. 27, 2020

(54) STATOR SUPPORT FOR AN ELECTRIC MACHINE

(71) Applicant: GE AVIATION SYSTEMS LLC, Grand Rapids, MI (US)

(72) Inventors: Michael Francis Michalski, Beavercreek, OH (US); Todd Eric Rook, Tipp City, OH (US); Paul James Wirsch, Jr., Springboro, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 239 days.

(21) Appl. No.: 15/491,590

(22) Filed: Apr. 19, 2017

(65) Prior Publication Data

US 2018/0198347 A1    Jul. 12, 2018

Related U.S. Application Data

(60) Provisional application No. 62/443,994, filed on Jan. 9, 2017.

(51) Int. Cl.
| | |
|---|---|
| *H02K 5/26* | (2006.01) |
| *H02K 5/20* | (2006.01) |
| *H02K 9/02* | (2006.01) |
| *H02K 9/19* | (2006.01) |

(52) U.S. Cl.
CPC ............ *H02K 5/26* (2013.01); *H02K 5/20* (2013.01); *H02K 9/02* (2013.01); *H02K 9/19* (2013.01)

(58) Field of Classification Search
CPC .. H02K 5/26; H02K 5/20; H02K 9/02; H02K 9/19

USPC .......................................................... 310/52
See application file for complete search history.

(56) References Cited

U.S. PATENT DOCUMENTS

| | | | |
|---|---|---|---|
| 5,053,663 A * | 10/1991 | Boer ...................... | H02K 3/47 310/179 |
| 5,355,045 A | 10/1994 | Hisey | |
| 5,592,039 A * | 1/1997 | Guardiani ............... | H02K 1/20 310/113 |
| 6,199,871 B1 | 3/2001 | Lampes | |
| 6,300,693 B1 * | 10/2001 | Poag ...................... | H02K 5/20 310/54 |
| 7,202,587 B2 | 4/2007 | Sargeant et al. | |
| 7,266,884 B2 | 9/2007 | Stewart et al. | |
| 7,964,826 B2 * | 6/2011 | Ellis ....................... | H05B 3/50 219/541 |
| 8,197,202 B2 | 6/2012 | Olsen et al. | |

(Continued)

FOREIGN PATENT DOCUMENTS

| | | |
|---|---|---|
| CN | 103915929 A | 7/2014 |
| CN | 204156622 U | 2/2015 |

(Continued)

OTHER PUBLICATIONS

Chinese Patent Office, First Office Action re Application No. 201810029386.7, Aug. 29, 2019, 5 pages, China.

*Primary Examiner* — Terrance L Kenerly
(74) *Attorney, Agent, or Firm* — McGarry Bair PC

(57) ABSTRACT

A stator support 40 for an electric machine 10 includes a radial cut 70 in a support ring 46 that releases hoop stress in the support ring 46 and enables more radial displacement during heating and cold soak cycles in the stator 12, 16, thereby allowing a larger range of thermal conditions for the electric machine 10.

14 Claims, 3 Drawing Sheets

(56) References Cited

U.S. PATENT DOCUMENTS

| | | | |
|---|---|---|---|
| 9,039,376 B2 | 5/2015 | Udall et al. | |
| 2010/0327675 A1* | 12/2010 | Chen | B24B 23/04 |
| | | | 310/50 |
| 2013/0270828 A1 | 10/2013 | Legros | |
| 2014/0064958 A1 | 3/2014 | Kobayashi et al. | |
| 2014/0197701 A1* | 7/2014 | Hossain | H02K 9/22 |
| | | | 310/52 |
| 2016/0134169 A1 | 5/2016 | Han et al. | |
| 2016/0190876 A1 | 6/2016 | Mizutani et al. | |

FOREIGN PATENT DOCUMENTS

| | | |
|---|---|---|
| CN | 106208440 A | 12/2016 |
| CN | 208190458 U | 12/2018 |
| JP | 2004297936 A | 10/2004 |

* cited by examiner

STATOR SUPPORT FOR AN ELECTRIC MACHINE

CROSS-REFERENCE TO RELATED APPLICATION(S)

This application claims the benefit of U.S. Provisional Patent Application No. 62/443,994, filed Jan. 9, 2017, which is incorporated herein by reference in its entirety.

BACKGROUND OF THE INVENTION

Electric machines, such as electric motors and/or electric generators, are used in energy conversion. In the aircraft industry, it is common to find an electric motor having a combination of motor and generator modes, where the electric machine, in motor mode, is used to start an aircraft engine, and, depending on the mode, functions as a generator, too, to supply electrical power to the aircraft systems. Regardless of the mode, an electric machine typically includes a stator with windings that works in conjunction with a rotor that also has windings and is driven to rotate by a source of rotation, which for a generator can be a gas turbine engine or for a motor can be the stator.

BRIEF DESCRIPTION OF THE INVENTION

In one aspect, a stator support for an electric machine includes an outer case, a frame in the outer case, and a support ring in the frame having nodes of coolant passages. A core is configured to retain stator windings, and the support ring is split by a radial cut.

In another aspect, an electric machine includes a stator and a rotor mounted to a rotatable shaft for rotation within the stator. The stator includes a stator support having a frame, a support ring in the frame, and a core within the support ring. The support ring is split by a radial cut.

In yet another aspect, an electric machine assembly for mounting to a gas turbine engine has a first machine and a second machine, each of the first machine and the second machine having a stator and a rotor. A rotatable shaft is configured to connect to the gas turbine engine, and each of the first machine rotor and the second machine rotor is mounted to the rotatable shaft. The first machine stator or the second machine stator or both has a frame, a support ring in the frame, and a core within the support ring. The support ring is split by a radial cut.

DESCRIPTION OF EMBODIMENTS OF THE INVENTION

While aspects of the disclosure can be implemented in any environment using synchronous electric machine or main machine, a specific example of which is a generator. The generator is currently contemplated to be implemented in a jet engine environment. Aspects of the disclosure can alternatively include a starter/generator and can provide turbine engine starting capabilities, wherein the starter/generator provides the mechanical power to drive the turbine engine through a starting method. A brief summary of the contemplated generator environment should aid in a more complete understanding.

Figure 1:
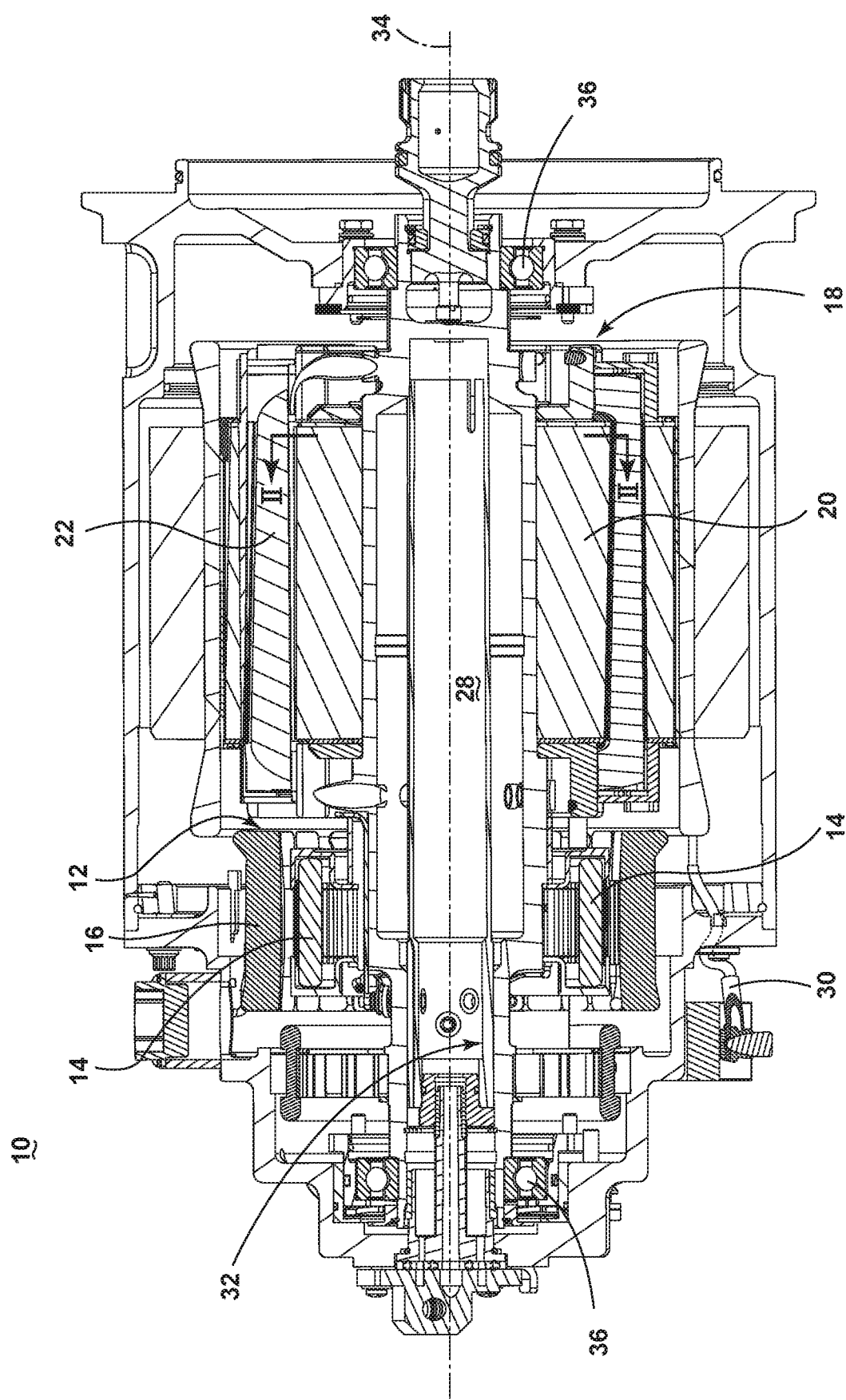
FIG. 1 is a sectional view of an electric machine capable of operation as a starter/generator within which a stator support is provided according to an aspect of the disclosure.

FIG. 1 illustrates an electric machine assembly 10 mounted on or within a gas turbine aircraft engine. The gas turbine engine can be a turbofan engine, such as a General Electric GEnx or CF6 series engine, commonly used in modern commercial and military aviation or it could be a variety of other known gas turbine engines such as a turboprop or turboshaft.

The electrical machine assembly 10 comprises a first machine 12 having an exciter rotor 14 and an exciter stator 16, and a synchronous second machine 18 having a main machine rotor 20 and a main machine stator 22. At least one power connection is provided on the exterior of the electrical machine assembly 10 to provide for the transfer of electrical power to and from the electrical machine assembly 10. Power is transmitted by this power connection, shown as an electrical power cable 30, directly or indirectly, to the electrical load and can provide for a three phase with a ground reference output from the electrical machine assembly 10.

The electrical machine assembly 10 further comprises a rotatable shaft 32 mechanically coupled to a source of axial rotation, which can be a gas turbine engine, about an axis of rotation 34. The rotatable shaft 32 is supported by spaced bearings 36. The exciter rotor 14 and main machine rotor 20 are mounted to the rotatable shaft 32 for rotation relative to the stators 16, 22, which are rotationally fixed within the electrical machine assembly 10. The stators 16, 22 can be mounted to any suitable part of a housing portion of the electrical machine assembly 10. The rotatable shaft 32 is configured such that mechanical force from a running turbine engine provides rotation to the shaft 32. Alternatively, in the example of a starter/generator, rotation of the rotatable shaft 32 of the electrical machine assembly 10 during a starting mode produces a mechanical force that is transferred through the shaft 32 to provide rotation to the turbine engine.

The rotatable shaft 32 can further include a central coolant passage 28 extending axially along the interior of the shaft 32. The central coolant passage 28 allows coolant, for example, oil or air, to flow through the interior of the rotatable shaft 32. In the illustrated embodiment, the second machine 18 is located in the rear of the electric machine assembly 10 and the first machine 12 is positioned in the front of the electric machine assembly 10. Other positions of the first machine 12 and the second machine 18 are envisioned.

Figure 2:
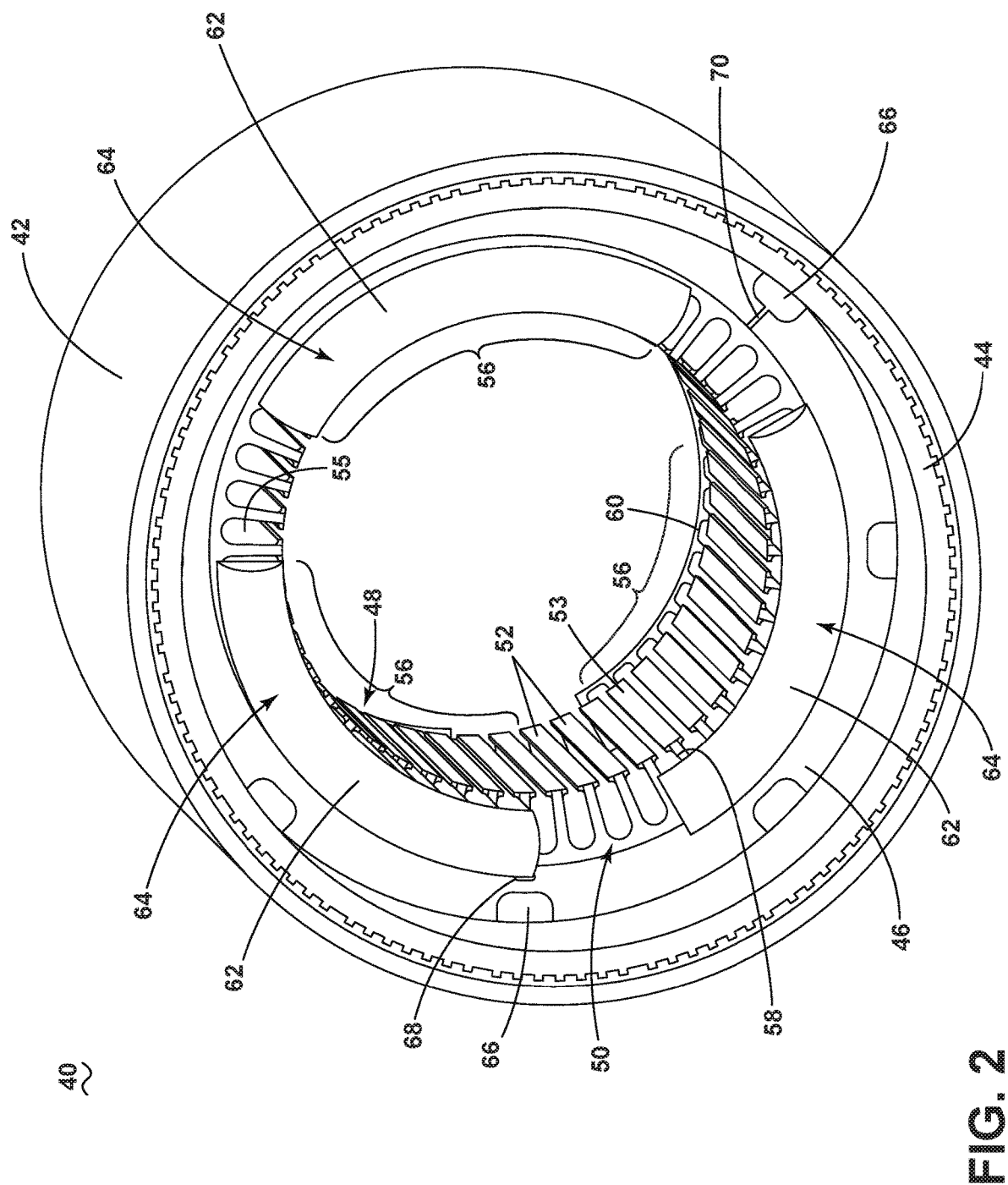
FIG. 2 is an isometric view of a stator support of FIG. 1 according to an aspect of the disclosure.
Figure 3:
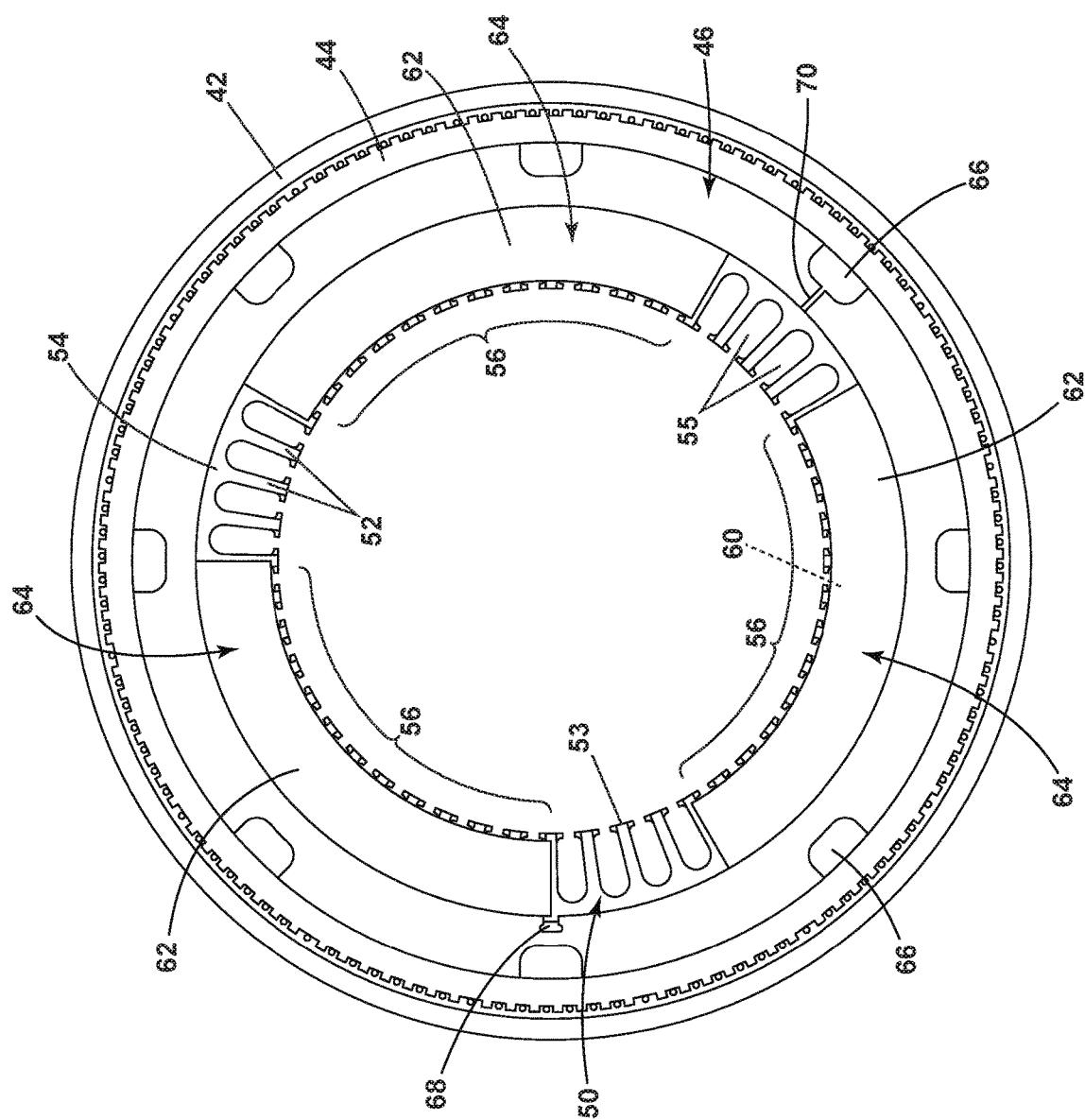
FIG. 3 is a plan view of the stator support of FIG. 2.

FIG. 2 illustrates an isometric view of a stator support 40 for either one of the stators 16, 22. The stator support 40 is shown comprising an outer case 42 encompassing a frame 44. The outer case 42 can be cast aluminum alloy such as A357, and the frame 44 can be formed of aluminum such as T6-6061 to assist in heat transfer and to save weight. Radially inside the frame 44 is a support ring 46, preferably made of a heat conductive material such as T6-6061 aluminum. Radially inside the support ring 46 is a core 48. Preferably, the core 48 is press fit into the support ring with about a 2.5 mil clearance, the support ring is press fit into the frame with about a 2.5 mil clearance, and the frame is press fit into the outer case 42 with about a 1 mil clearance.

The core 48 comprises a core ring 50 with a set of radial elements 52 spaced radially from each other about the core ring 50, and formed of a conductive material such as Hiperco-50. Each radial element has a cap 53 that partly overlies a slot 55 extending axially adjacent each radial element 52. The axial ends of the core ring 50 are capped with a first dielectric insulator 54 preferably formed of melamine. Three subsets 56 of the set of radial elements 52 are covered with a second insulator 58 (except for the caps 53), preferably formed of Kapton, and retain conductive wires 60, preferably copper, in each slot 55. End caps 62, also made of copper, cover the axial ends of the three subsets 56. The three subsets 56, second insulator 58, conductive wires 60, and end caps 62 together form windings 64 for the stator support 40.

The support ring 46 further at least partially defines nodes 66 of coolant passages, located adjacent to the frame 44, and extending axially in parallel with the set of radial elements 52. Also between the support ring and the core ring 50 is a keyway 68 to maintain a position of the core 48 relative to the support ring 46. A radial cut 70 is provided in the support ring 46 to completely split the ring, preferably at a node 66 disposed between two windings 64. The radial cut 70 releases hoop stress in the support ring 46 and enables more radial displacement during heating and cold soak cycles in the stator 12, 16, thereby allowing a larger range of thermal conditions for the electric machine 10.

During generating operation, the rotor 20 is rotated about the axis of rotation 34 by a mechanical force, such as a turbine engine, coupled with the rotatable shaft 32. During rotation, rotor windings are energized to create a pole, for example, DC power from a rectified AC power output of the exciter rotor 14. The rotation of the pole relative to a stator 16, 22 generates a power output, such as an AC power output, which is then transmitted by the electrical power cable 30 to an electrical system, for instance, a power distribution node.

Additionally, during generating operation, the rotation of the rotor 20 relative to the a stator 16, 22 typically causes eddy current losses and heat due to the changing magnetic field and/or magnetic flux harmonics in the air gap between the rotor 20 and the stator 16, 22.

Many other possible embodiments and configurations in addition to that shown in the above figures are contemplated by the present disclosure. For example, one aspect of the disclosure contemplates more or fewer of the electrical machine assembly 10 components mentioned. Another aspect of the disclosure contemplates locating the radial cut 70 elsewhere on the support ring 46, such as another node 66 or between nodes 66.

To the extent not already described, the different features and structures of various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A stator support for an electric machine comprising:
   an outer case;
   a frame press-fittingly engaged with and encompassed by the outer case;
   a support ring press-fittingly engaged with the frame and having nodes of coolant passages; and
   a core configured to retain stator windings, wherein the support ring is completely split by a radial cut.

2. The stator support of claim 1 wherein the radial cut is located at a coolant passage node.

3. The stator support of claim 1 further comprising a keyway between the support ring and the core.

4. The stator support of claim 1 wherein the core is press fit into the support ring, the support ring is press fit into the frame, and the frame is press fit into the outer case.

5. The stator support of claim 1 wherein the core includes a core ring.

6. An electric machine comprising:
   an outer case;
   a stator; and
   a rotor mounted to a rotatable shaft for rotation within the stator;
   wherein the stator includes a stator support having a frame, wherein the frame is press-fittingly engaged with and encompassed by the outer case, a support ring press-fittingly engaged with the frame, and a core within the support ring, and
   wherein the support ring defines nodes of axially extending coolant passages, and is completely split by a radial cut located that enables radial displacement during at least one of heating or cold cycles in the stator.

7. The electric machine of claim 6 further comprising a keyway between the support ring and the core.

8. The electric machine of claim 6 wherein the core includes a core ring.

9. An electric machine assembly for mounting to a gas turbine engine, comprising:
   a first machine and a second machine, each of the first machine and the second machine having an outer case, a stator and a rotor,
   a rotatable shaft configured to connect to the gas turbine engine, each of the first machine rotor and the second machine rotor being mounted to the rotatable shaft; and
   at least one of the first machine stator and the second machine stator having a frame press-fittingly engaged with and encompassed by the outer case, a support ring press-fittingly engaged with the frame, and a core within the support ring, wherein the support ring is completely split by a radial cut.

10. The electric machine assembly of claim 9 further comprising nodes of coolant passages in the support ring wherein the radial cut is located at a coolant passage node.

11. The electric machine assembly of claim 9 further comprising a keyway between the support ring and the core.

12. The electric machine assembly of claim 9 wherein the core includes a core ring.

13. The stator support of claim 1 wherein the support ring is completely split at a circumferential portion by a radial cut.

14. The stator support of claim 1 wherein the support ring is circumferentially discontinuous at the radial cut.

* * * * *